US012741237B2

(12) United States Patent
Choi et al.

(10) Patent No.: US 12,741,237 B2
(45) Date of Patent: Sep. 22, 2026

(54) METHOD OF CIRCULATING CHEMICAL LIQUID AND METHOD OF PROCESSING SUBSTRATE

(71) Applicant: SEMES CO., LTD., Chungcheongnam-do (KR)

(72) Inventors: Gi Hun Choi, Chungcheongnam-do (KR); Seung Tae Yang, Chungcheongnam-do (KR); Seong Hyeon Kim, Chungcheongnam-do (KR); Sang Woo Park, Chungcheongnam-do (KR)

(73) Assignee: SEMES CO., LTD., Chungcheongnam-Do (KR)

( * ) Notice: Subject to any disclaimer, the term of this patent is extended or adjusted under 35 U.S.C. 154(b) by 572 days.

(21) Appl. No.: 18/350,252

(22) Filed: Jul. 11, 2023

(65) Prior Publication Data

US 2024/0216834 A1 Jul. 4, 2024

(30) Foreign Application Priority Data

Dec. 29, 2022 (KR) ........................ 10-2022-0188946

(51) Int. Cl.
*B01D 19/00* (2006.01)

(52) U.S. Cl.
CPC ..... *B01D 19/0063* (2013.01); *B01D 19/0068* (2013.01)

(58) Field of Classification Search
CPC ................ B01D 19/00; B01D 19/0036; B01D 19/0063; B01D 19/0068; B08B 3/14; F16L 55/07; F17D 1/08; F17D 3/01; F17D 5/00; H10P 72/0402
See application file for complete search history.

(56) References Cited

U.S. PATENT DOCUMENTS 5,762,684 A * 6/1998 Hayashi ............. B01D 19/0063 96/417
2007/0214964 A1 9/2007 Miyashita et al.
(Continued)

FOREIGN PATENT DOCUMENTS

JP 2007-275866 A 10/2007
KR 10-2005-0065283 A 6/2005
KR 10-2014-0129040 A 11/2014
(Continued)

OTHER PUBLICATIONS

KR20220150605A translation, accessed Feb. 2, 2026 (Year: 2022).*
Korean Office Action dated Apr. 22, 2024 issued in corresponding KR Patent Application No. 10-2022-0188946, pp. 1-5.

*Primary Examiner* — Jennifer Dieterle
*Assistant Examiner* — Phillip Y Shao
(74) *Attorney, Agent, or Firm* — Carter, DeLuca & Farrell LLP

(57) ABSTRACT

A method of circulating chemical liquid includes a chemical liquid circulation step of circulating chemical liquid through a chemical liquid supply line and a chemical liquid recovery line installed in a tank of a chemical liquid circulation portion; and a chemical liquid circulation preparation step of removing air bubbles in chemical liquid recovered to the chemical liquid recovery line by opening the chemical liquid recovery line before the chemical liquid supply line is opened, before the chemical liquid circulation step.

20 Claims, 8 Drawing Sheets

(56) References Cited

U.S. PATENT DOCUMENTS

| | | | |
|---|---|---|---|
| 2015/0000517 | A1 | 1/2015 | Yoshihara et al. |
| 2020/0395228 | A1* | 12/2020 | Oh ...................... H10P 72/0414 |

FOREIGN PATENT DOCUMENTS

| | | | |
|---|---|---|---|
| KR | 10-2017-0007111 | A | 1/2017 |
| KR | 10-2019-0079088 | A | 7/2019 |
| KR | 10-2022-0150605 | A | 11/2022 |

* cited by examiner

| | FIRST RECOVERY LINE (FIRST RECOVERY VALVE) | FIRST SUPPLY LINE (FIRST SUPPLY VALVE) | SECOND RECOVERY LINE (SECOND RECOVERY VALVE) | SECOND SUPPLY LINE (SECOND SUPPLY VALVE) |
|---|---|---|---|---|
| FIRST CHEMICAL LIQUID EXCHANGING STEP (SECON TANK -> FIRST TANK) | OPEN | OPEN | CLOSE | OPEN |
| FIRST CHEMICAL LIQUID CIRCULATION STEP (FIRST TANK CHEMICAL LIQUID CIRCULATION) | OPEN | OPEN | CLOSE | CLOSE |
| SECOND CHEMICAL LIQUID EXCHANGING STEP (FIRST TANK -> SECOND TANK) | CLOSE | OPEN | OPEN | OPEN |
| SECOND CHEMICAL LIQUID CIRCULATION STEP (SECOND TANK CHEMICAL LIQUID CIRCULATION) | CLOSE | CLOSE | OPEN | OPEN |

FIG. 3

| | FIRST RECOVERY LINE (FIRST RECOVERY VALVE) | FIRST SUPPLY LINE (FIRST SUPPLY VALVE) | SECOND RECOVERY LINE (SECOND RECOVERY VALVE) | SECOND SUPPLY LINE (SECOND SUPPLY VALVE) |
|---|---|---|---|---|
| FIRST CHEMICAL LIQUID CIRCULATION PREPARATION STEP (PREPARATION OF FIRST TANK CHEMICAL LIQUID CIRCULATION) | <u>OPEN</u> | <u>CLOSE</u> | OPEN | OPEN |
| FIRST CHEMICAL LIQUID EXCHANGING STEP (SECON TANK -> FIRST TANK) | OPEN | OPEN | CLOSE | OPEN |
| FIRST CHEMICAL LIQUID CIRCULATION STEP (FIRST TANK CHEMICAL LIQUID CIRCULATION) | OPEN | OPEN | CLOSE | CLOSE |
| SECOND CHEMICAL LIQUID CIRCULATION PREPARATION STEP (PREPARATION OF SECOND TANK CHEMICAL LIQUID CIRCULATION) | OPEN | OPEN | <u>OPEN</u> | <u>CLOSE</u> |
| SECOND CHEMICAL LIQUID EXCHANGING STEP (FIRST TANK -> SECOND TANK) | CLOSE | OPEN | OPEN | OPEN |
| SECOND CHEMICAL LIQUID CIRCULATION STEP (SECOND TANK CHEMICAL LIQUID CIRCULATION) | CLOSE | CLOSE | OPEN | OPEN |

FIG. 6

METHOD OF CIRCULATING CHEMICAL LIQUID AND METHOD OF PROCESSING SUBSTRATE

CROSS-REFERENCE TO RELATED APPLICATIONS

The application claims benefit of priority to Korean Patent Application No. 10-2022-0188946 filed on Dec. 29, 2022 in the Korean Intellectual Property Office, the disclosure of which is incorporated herein by reference in its entirety.

BACKGROUND

1. Field

Embodiments of the present disclosure relate to a method of circulating chemical liquid and a method of processing a substrate.

2. Description of Related Art

Contaminants such as particles, organic contaminants, and metal contaminants remaining on a substrate surface may greatly affect characteristics of a semiconductor device and production yield. For the reason, a cleaning process of removing various contaminants attached to the surface of the substrate may be important in the process of manufacturing a semiconductor, and the process of cleaning the substrate may be performed in stages before and after each unit process of manufacturing a semiconductor.

Generally, the process of cleaning a substrate may include a treatment process of removing metal foreign substances, organic substances, or particles remaining on the substrate using a chemical liquid, a rinsing process of removing chemicals remaining on the substrate, and a drying process of drying the substrate using nitrogen gas or supercritical fluid.

The chemical liquid supply unit may supply chemical liquid to a nozzle unit. Generally, a chemical liquid supply unit may include a tank for storing chemical liquid, a chemical liquid supply line for providing chemical liquid from an internal space of the tank to the nozzle unit, and a chemical liquid recovery line for recovering chemical liquid. In the case, the chemical liquid supply line may extend to the process chamber, and may be also connected to the chemical liquid recovery line such that the chemical liquid may not stagnate and may continue to circulate. Accordingly, a tank, a chemical liquid supply line and a chemical liquid recovery line may be referred to as a chemical liquid circulation portion. Also, two or more tanks may be provided to prevent the supply of chemical liquid from being stopped due to exhaustion of the chemical liquid in the tank.

The chemical liquid supply unit may supply chemical liquid at a predetermined temperature to a nozzle unit. A heater may be provided in each line to provide high temperature chemical liquid depending on processes. Generally, a temperature sensor may be provided on a discharge end of the heater. Based on the temperature of the chemical liquid measured by the temperature sensor, the chemical liquid may be heated to a preset temperature. However, since the chemical liquid is heated without considering the temperature of the contact surface of the heater and the chemical liquid, the chemical liquid may be heated in a contact portion between the heater and the chemical liquid and may form air bubbles. The air bubbles may form particles on the substrate while the substrate is processed.

SUMMARY

An example embodiment of the present disclosure is to provide a method of circulating chemical liquid of removing air bubbles in chemical liquid, and a method of processing a substrate.

According to an aspect of an example embodiment of the present disclosure, a method of circulating chemical liquid includes a chemical liquid circulation step of circulating chemical liquid through a chemical liquid supply line and a chemical liquid recovery line installed in a tank of a chemical liquid circulation portion; and a chemical liquid circulation preparation step of removing air bubbles in chemical liquid recovered to the chemical liquid recovery line by opening the chemical liquid recovery line before the chemical liquid supply line is opened, before the chemical liquid circulation step.

The chemical liquid circulation portion may include at least a first chemical liquid circulation portion and a second chemical liquid circulation portion, the chemical liquid circulation preparation step includes a first chemical liquid circulation preparation step of opening a first chemical liquid recovery line installed in a first tank before opening a first chemical liquid supply line installed in the first tank of the first chemical liquid circulation portion, and the chemical liquid circulation step may include a first chemical liquid circulation step performed after the first chemical liquid circulation preparation step and circulating the chemical liquid through the first chemical liquid supply line and the first chemical liquid recovery line.

In the first chemical liquid circulation step, the second chemical liquid supply line and the second chemical liquid recovery line installed in a second tank of the second chemical liquid circulation portion may be in a closed state.

The method may further include a first chemical liquid exchanging step of closing the second chemical liquid recovery line and opening the first chemical liquid supply line between the first chemical liquid circulation preparation step and the first chemical liquid circulation step.

The chemical liquid circulation preparation step may include a second chemical liquid circulation preparation step of opening the second chemical liquid recovery line before opening the second chemical liquid supply line after the first chemical liquid circulation step, and the chemical liquid circulation step may include a second chemical liquid circulation step of circulating the chemical liquid through the second chemical liquid supply line and the second chemical liquid recovery line after the second chemical liquid circulation preparation step. In the second chemical liquid circulation step, the first chemical liquid supply line and the first chemical liquid recovery line may be in a closed state.

The method further may include a second chemical liquid exchanging step of closing the first chemical liquid recovery line and opening the second chemical liquid supply line between the second chemical liquid circulation preparation step and the second chemical liquid circulation step.

The first chemical liquid circulation preparation step, the first chemical liquid exchanging step, the first chemical liquid circulation step, the second chemical liquid circulation preparation step, the second chemical liquid exchanging step, and the second chemical liquid circulation step may be repeated in order.

The first chemical liquid supply line and the second chemical liquid supply line may be connected to a main supply line in which a pump is installed, and the first chemical liquid recovery line and the second chemical liquid recovery line may be connected to a main recovery line.

The main supply line may be connected to the main recovery line, and the main supply line may be connected to the process chamber by at least one chamber supply line.

A deaeration unit may be installed in the chemical liquid supply line, and air bubbles of the chemical liquid may be removed by the deaeration unit.

According to another aspect of an example embodiment of the present disclosure, a method of circulating chemical liquid includes a first chemical liquid circulation step of circulating chemical liquid through a first chemical liquid supply line and a first chemical liquid recovery line installed in a first tank of a first chemical liquid circulation portion; and a first chemical liquid circulation preparation step of removing air bubbles in chemical liquid recovered to the first chemical liquid recovery line by opening a first recovery valve of the first chemical liquid recovery line before a first supply valve of the first chemical liquid supply line is opened, before the chemical liquid circulation step, wherein, in the first chemical liquid circulation step, a second supply valve of a second chemical liquid supply line installed in a second tank of a second chemical liquid circulation portion and a second recovery valve of a second chemical liquid recovery line installed in the second tank are in a closed state.

The method may further include a first chemical liquid exchanging step of closing the second recovery valve of the second chemical liquid recovery line and opening the first supply valve of the first chemical liquid supply line between the first chemical liquid circulation preparation step and the first chemical liquid circulation step.

The method may further include a second chemical liquid circulation preparation step of opening the second recovery valve of the second chemical liquid recovery line before opening the second supply valve of the second chemical liquid supply line, after the first chemical liquid circulation step; and a second chemical liquid circulation step of circulating the chemical liquid through the second chemical liquid supply line and the second chemical liquid recovery line, after the second chemical liquid circulation preparation step, wherein, in the second chemical liquid circulation step, the first supply valve of the first chemical liquid supply line and the first recovery valve of the first chemical liquid recovery line are in a closed state.

The method may further include a second chemical liquid exchanging step of closing the first recovery valve of the first chemical liquid recovery line and opening the second supply valve of the second chemical liquid supply line between the second chemical liquid circulation preparation step and the second chemical liquid circulation step.

According to another aspect of an example embodiment of the present disclosure, a method of processing a substrate includes a first chemical liquid circulation step of circulating chemical liquid through a first chemical liquid supply line and a first chemical liquid recovery line installed in a first tank of a first chemical liquid circulation portion, wherein a second supply valve of a second chemical liquid supply line installed in a second tank of a second chemical liquid circulation portion and a second recovery valve of a second chemical liquid recovery line installed in the second tank are in a closed state; and a first chemical liquid circulation preparation step of removing air bubbles of chemical liquid recovered to the first chemical liquid recovery line by opening a first recovery valve of the first chemical liquid recovery line before a first supply valve of the first chemical liquid supply line is opened, wherein the chemical liquid circulation preparation step is performed before the chemical liquid circulation step; and a chemical liquid supplying step of supplying the chemical liquid from the first chemical liquid supply line or the second chemical liquid supply line to the process chamber to discharge the chemical liquid to the substrate disposed in the process chamber when the substrate is processed in the process chamber.

The method may further include a chemical liquid supplying step of supplying the chemical liquid from the first chemical liquid supply line or the second chemical liquid supply line to the process chamber to discharge the chemical liquid to the substrate disposed in the process chamber when the substrate is processed in the process chamber.

BRIEF DESCRIPTION OF DRAWINGS

The above and other aspects, features, and advantages of the present disclosure will be more clearly understood from the following detailed description, taken in conjunction with the accompanying drawings, in which:

FIG. 3 is a diagram illustrating a method of circulating chemical liquid in FIG. 2 according to an example embodiment of the present disclosure;

FIG. 6 is a table relating to a method of circulating chemical liquid according to an example embodiment of the present disclosure;

DETAILED DESCRIPTION

Figure 1:
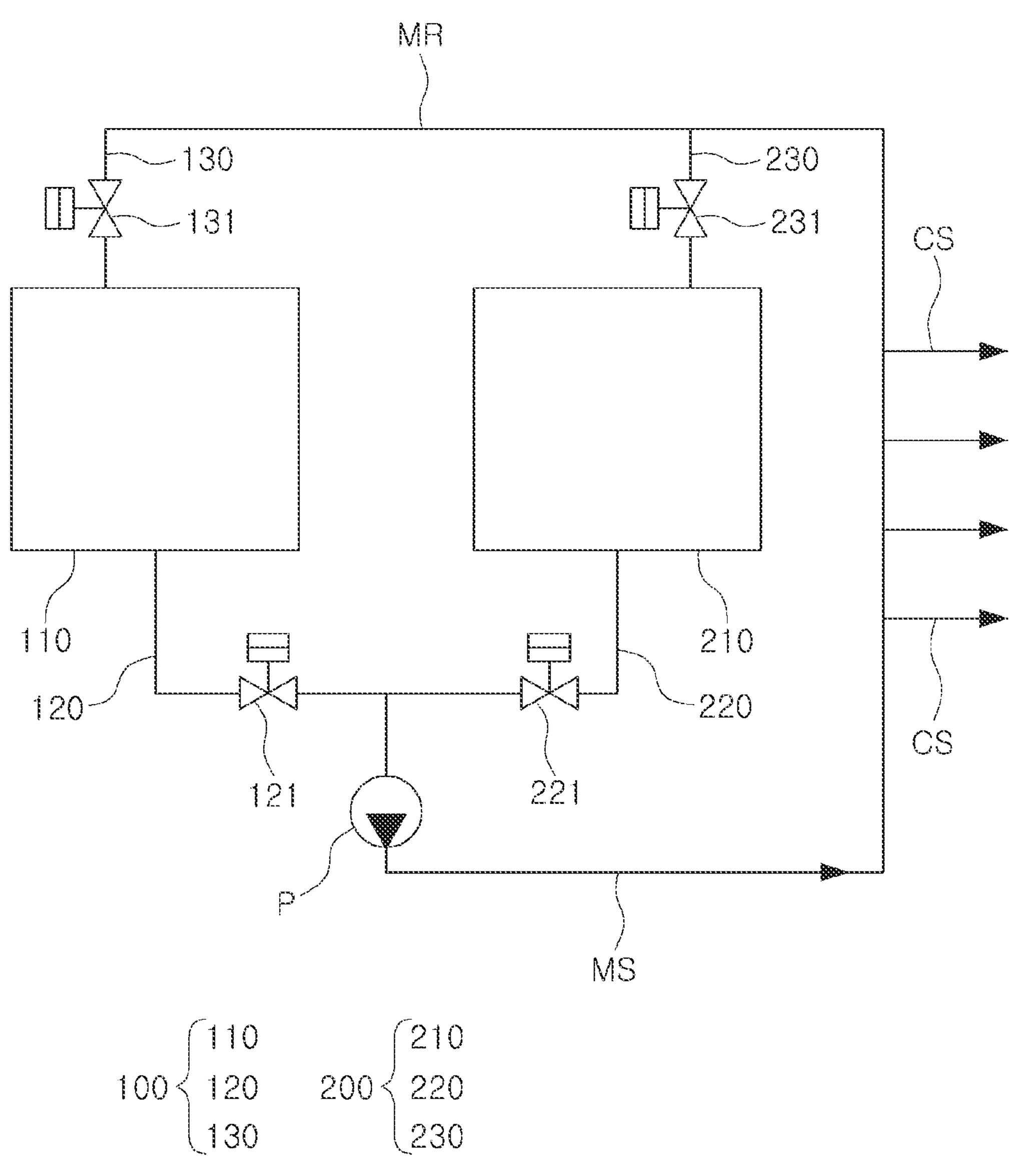
FIG. 1 is a diagram illustrating a chemical liquid circulation portion according to an example embodiment of the present disclosure.

Hereinafter, embodiments of the present disclosure will be described as below with reference to the attached drawings.

In the drawings, same elements will be indicated by same reference numerals. Also, redundant descriptions and detailed descriptions of known functions and elements that may unnecessarily make the gist of the present disclosure obscure will be omitted. In the accompanying drawings, some elements may be exaggerated, omitted or briefly illustrated, and the sizes of the elements do not necessarily reflect the actual sizes of these elements. Also, the terms "upper," "upper portion," "upper surface," "lower," "lower portion," "lower surface," "side surface" are based on the drawings, and may be varied in a direction in which the components are disposed.

In the example embodiments, the term "connected" may not only refer to "directly connected" but also include "indirectly connected" by means of an adhesive layer, or the like. Also, the term "electrically connected" may include both of the case in which elements are “physically connected” and the case in which elements are “not physically connected.” The terms, “include,” “comprise,” “is configured to,” or the like of the description are used to indicate the presence of features, numbers, steps, operations, elements, portions or combination thereof, and do not exclude the possibilities of combination or addition of one or more features, numbers, steps, operations, elements, portions or combination thereof.

FIG. 1 is a diagram illustrating a chemical liquid circulation portion according to an example embodiment.

Referring to the drawing, the chemical liquid circulation portion may include a tank, a chemical liquid supply line, and a chemical liquid recovery line.

The chemical liquid contained in the tank may continuously go through chemical liquid circulation of being supplied through a chemical liquid supply line and recovered through a chemical liquid recovery line connected to the chemical liquid supply line. The continuous circulation of chemical liquid may maintain the chemical liquid at a predetermined temperature, may prevent particles from accumulating, and may further prevent chemical liquid properties from changing. During the continuous chemical liquid circulation process described above, when the processing for the substrate is performed in the process chamber, the circulated chemical liquid may be partially supplied from the chemical liquid supply line to the process chamber side through the chamber supply line.

The chemical liquid circulation portion will be described in greater detail.

The tank may be a member in which the chemical liquid is accommodated, and two or more tanks may be provided to prevent the supply of chemical liquid from being stopped due to exhaustion of the chemical liquid in the process chamber. Each of these two or more tanks may include a chemical liquid recovery line and a chemical liquid supply line.

As such, the chemical liquid circulation portion may include a first chemical liquid circulation portion 100 and a second chemical liquid circulation portion 200 as illustrated in the drawing as an example.

The first chemical liquid circulation portion 100 may include a first tank 110, a first chemical liquid supply line 120, and a first chemical liquid recovery line. A first chemical liquid supply line 120 may be installed below the first tank 110 and a first chemical liquid recovery line 130 may be installed above the first tank 110. A first supply valve 121 may be installed in the first chemical liquid supply line 120, and a first recovery valve 131 may be installed in the first chemical liquid recovery line 130.

Also, the second chemical liquid circulation portion 200 may include a second tank 210, a second chemical liquid supply line 220, and a second chemical liquid recovery line. A second chemical liquid supply line 220 may be installed below the second tank 210 and a second chemical liquid recovery line 230 may be installed above the second tank 210. A second supply valve 221 may be installed in the second chemical liquid supply line 220, and a first recovery valve 231 may be installed in the second chemical liquid recovery line 230.

The first chemical liquid supply line 120 and the second chemical liquid supply line 220 may be connected to the main supply line MS, and the first chemical liquid recovery line 130 and the second chemical liquid recovery line (230) may be connected to the main recovery line MR. A pump P may be installed in the main supply line MS and may provide fluid power to flow the chemical liquid for circulation of the chemical liquid.

The main supply line MS and the main recovery line MR may be connected to each other such that the chemical liquid may continue to circulate. The main supply line MS may be connected to a process chamber (not illustrated) by at least one chamber supply line CS. While the chemical liquid continuously circulates, the chemical liquid may be supplied to the process chamber side through the chamber supply line CS and may be discharged to the substrate when the substrate treatment process is performed in the process chamber. In the case, although not illustrated in the drawings, the main recovery line MR may be connected to the process chamber by a chamber recovery line, thereby recovering the chemical liquid used in the process chamber.

Further, as described above, in the example embodiment, two chemical liquid circulation portions may be provided, but an example embodiment thereof is not limited thereto and more that two chemical liquid circulation portions may be provided. Hereafter, the method of circulating chemical liquid will be described in detail under the condition in which two chemical liquid circulation portions are provided.

Figure 2:
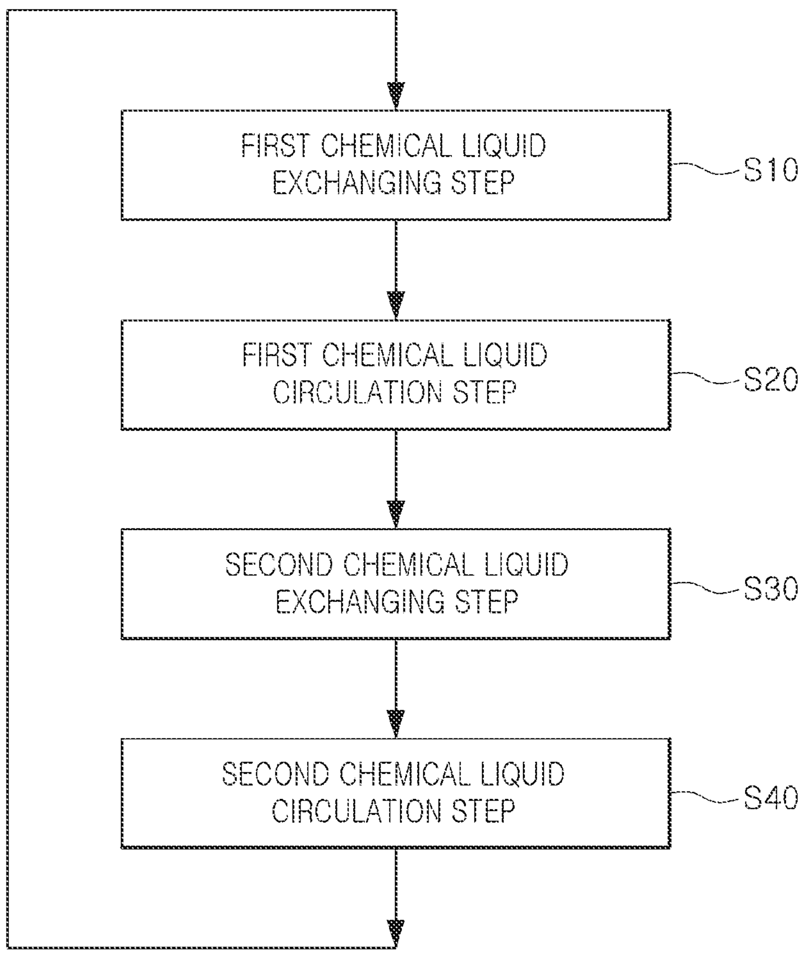
FIG. 2 is a flowchart illustrating a method of circulating chemical liquid according to the prior art.
Figure 4:
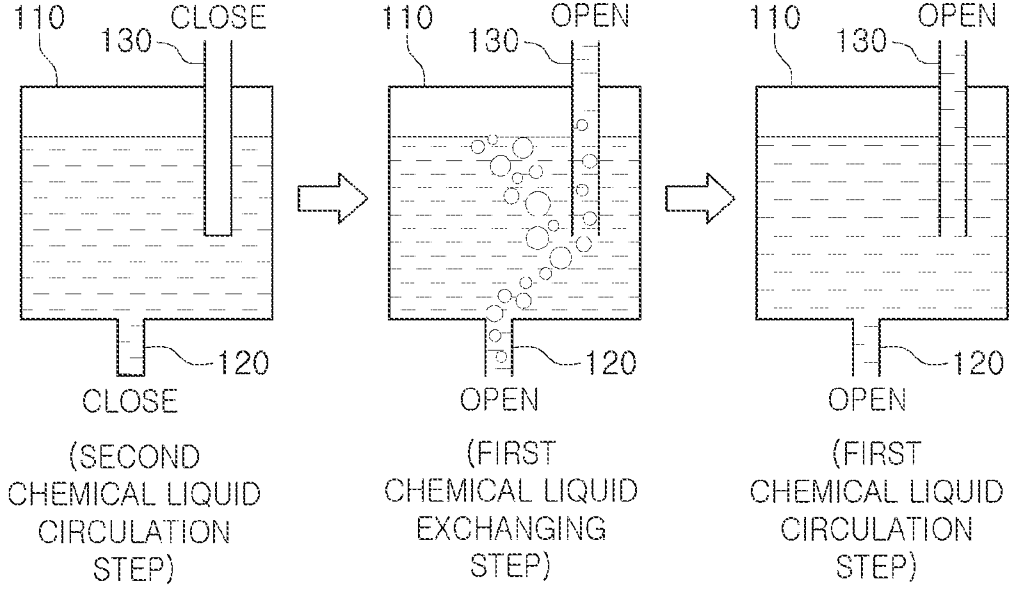
FIG. 4 is a diagram illustrating a method of circulating chemical liquid according to an example embodiment of the present disclosure.

FIG. 2 is a flowchart illustrating a method of circulating chemical liquid according to the prior art. FIG. 3 is a diagram illustrating a method of circulating chemical liquid in FIG. 2 according to an example embodiment. FIG. 4 is a diagram illustrating a method of circulating chemical liquid according to an example embodiment.

Referring to FIGS. 1 to 4, the method of circulating chemical liquid according to the prior art may include a first chemical liquid exchanging step (S10), a first chemical liquid circulation step (S20), a second chemical liquid exchanging step (S30), and a second chemical liquid circulation step (S40).

The first chemical liquid circulation step (S20) may be of circulating the chemical liquid in the first tank 110 through the first chemical liquid supply line 120 and the first chemical liquid recovery line 130 of the first chemical liquid circulation portion 100. In the case, the second chemical liquid supply line 220 and the second chemical liquid recovery line 230 of the second chemical liquid circulation portion 200 may be in a closed state.

The second chemical liquid circulation step (S40) may be of circulating the chemical liquid in the second tank 210 through the second chemical liquid supply line 220 and the second chemical liquid recovery line 230 of the second chemical liquid circulation portion 200. In the case, the first chemical liquid supply line 120 and the first chemical liquid recovery line 130 of the first chemical liquid circulation portion 100 may be in a closed state.

In the first chemical liquid exchanging step (S10) and the second chemical liquid exchanging step (S30) may be of changing the circulation and supply of chemical liquid to another tank when the chemical liquid contained in one tank is exhausted.

First, the first chemical liquid exchanging step (S10) may be performed between the second chemical liquid circulation step (S40) and the first chemical liquid circulation step (S20). When the closing the second chemical liquid supply line 220 and the second chemical liquid recovery line 230 of the second chemical liquid circulation portion 200 and the opening the first chemical liquid supply line 120 and the first chemical liquid recovery line 130 of the first chemical liquid circulation portion 100 are performed simultaneously, as the supply pressure of the chemical liquid is not maintained constant momentarily, the issue such as abnormal changes in the discharge pressure of the substrate may occur. To prevent the issue, the first chemical liquid exchanging step (S10) may be performed.

Specifically, in the first chemical liquid exchanging step (S10), the first chemical liquid supply line 120 and the first chemical liquid recovery line 130 of the first chemical liquid circulation portion 100 may be opened to circulate the chemical liquid in the first tank 110, and without closing the second chemical liquid supply line 220 of the second chemical liquid circulation portion 200, only the second chemical liquid recovery line 230 may be firstly closed. Thereafter, by closing the second chemical liquid supply line 220 in the first chemical liquid circulation step (S20), both the second chemical liquid supply line 220 and the second chemical liquid recovery line 230 of the second chemical liquid circulation portion 200 may be closed.

Also, the second chemical liquid exchanging step (S30) may be performed between the first chemical liquid circulation step (S20) and the second chemical liquid circulation step (S40). Similarly to the first chemical liquid exchanging step (S10), the second chemical liquid exchanging step (S30) may also maintain the supply pressure of the chemical liquid constant, that is, may prevent sudden change in the supply pressure of the chemical liquid.

Specifically, in the second chemical liquid exchanging step (S30), the second chemical liquid supply line 220 and the second chemical liquid recovery line 230 of the second chemical liquid circulation portion 200 may be opened to circulate the chemical liquid in the second tank 210, and without closing the first chemical liquid supply line 120 of the first chemical liquid circulation portion 100, only the first chemical liquid recovery line 130 may be firstly closed. Thereafter, by closing the first chemical liquid supply line 120 in the second chemical liquid circulation step (S40), both the first chemical liquid supply line 120 and the first chemical liquid recovery line 130 of the first chemical liquid circulation portion 100 may be closed.

However, according to the method of circulating chemical liquid of the prior art described above, as illustrated in FIG. 4, in the first chemical liquid exchanging step (S10), as the first chemical liquid supply line 120 and the first chemical liquid recovery line 130 are simultaneously opened, air bubbles of the chemical liquid recovered through the first chemical liquid recovery line 130 may flow into the first chemical liquid supply line 120.

Due to the air bubbles, foreign substance particles may easily adhere to the surface, and also, particles may be accumulated and foreign substance lumps may be formed. Accordingly, when chemical liquid containing air bubbles are supplied to the process chamber, substrate processing failure may occur due to particles.

Figure 5:
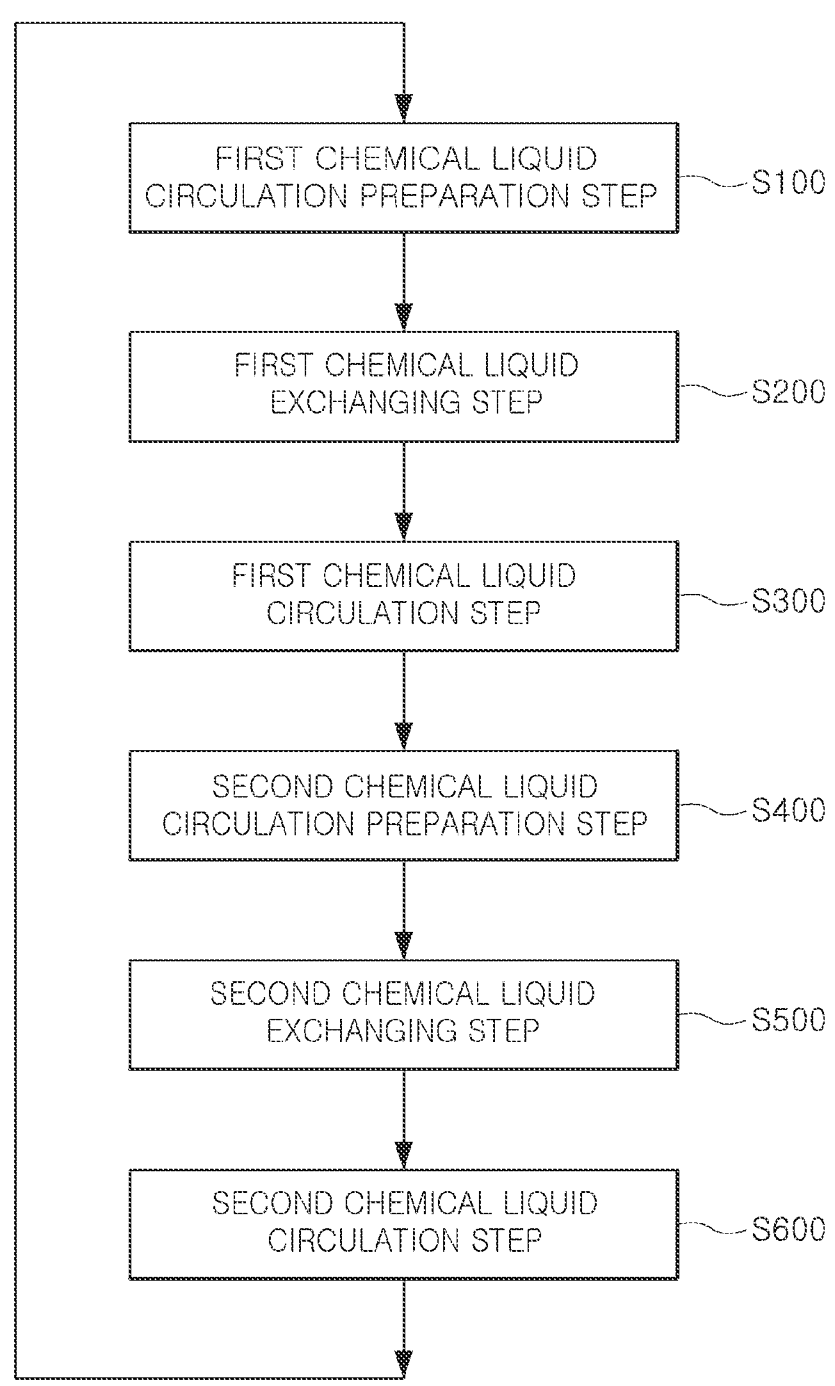
FIG. 5 is a flowchart illustrating a method of circulating chemical liquid according to an example embodiment of the present disclosure.
Figure 7:
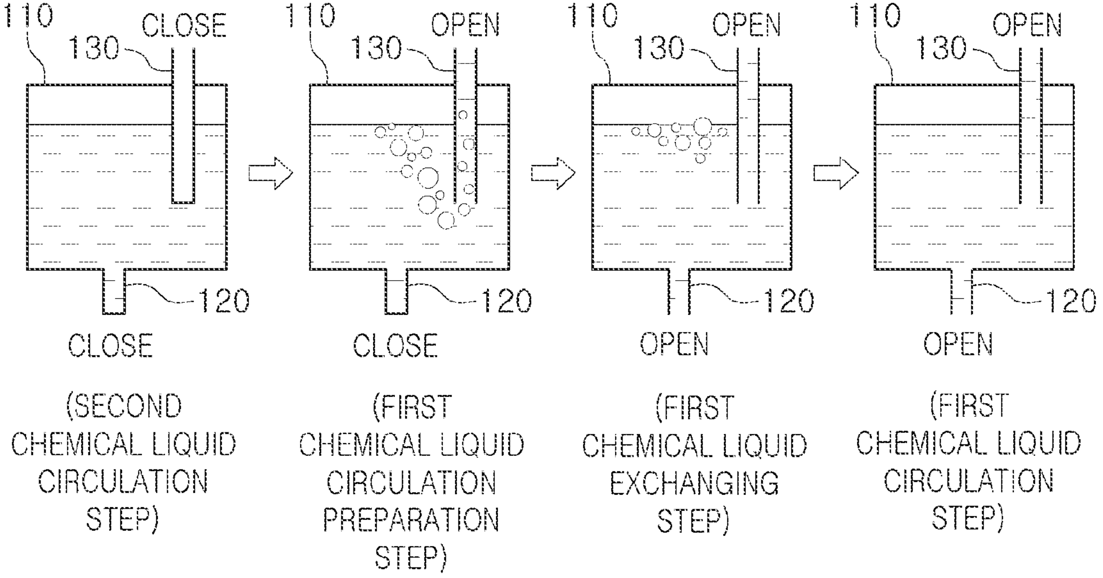
FIG. 7 is a diagram illustrating a method of circulating chemical liquid according to an example embodiment of the present disclosure.

FIG. 5 is a flowchart illustrating a method of circulating chemical liquid according to an example embodiment. FIG. 6 is a table relating to a method of circulating chemical liquid according to an example embodiment. FIG. 7 is a diagram illustrating a method of circulating chemical liquid according to an example embodiment.

Referring to FIGS. 1 and 5 to 7, the method of circulating chemical liquid in the example embodiment may include a chemical liquid circulation step and a chemical liquid circulation preparation step.

The chemical liquid circulation step may be of circulating the chemical liquid through a chemical liquid supply line and a chemical liquid recovery line installed in the tank of the chemical liquid circulation portion.

The chemical liquid circulation preparation step may be performed before the chemical liquid circulation step, and in the chemical liquid circulation step, the chemical liquid recovery line may be opened before the chemical liquid supply line is opened to remove air bubbles in chemical liquid recovered to the chemical liquid recovery line.

That is, in the chemical liquid circulation preparation step, by opening the chemical liquid recovery line before the chemical liquid supply line, air bubbles included in the chemical liquid recovered through the chemical liquid recovery line may not flow into the chemical liquid supply line, may rise to the upper side from the chemical liquid contained in the tank and may be removed from the chemical liquid, such that, when the chemical liquid supply line is opened in the chemical liquid exchanging step thereafter, the chemical liquid from which air bubbles are removed may be supplied through a chemical liquid supply line.

The example embodiment will be described in greater detail.

A plurality of the chemical liquid circulation portions may be provided in the example embodiment, and may include at least a first chemical liquid circulation portion 100 and a second chemical liquid circulation portion 200. In the case, the chemical liquid supply line may be the first chemical liquid supply line 120 installed in the first tank 110 or the second chemical liquid supply line 220 installed in the second tank 210. The chemical liquid recovery line may be a first chemical liquid recovery line 130 installed in the first tank 110 or a second chemical liquid recovery line 230 installed in the second tank 210. Here, the first chemical liquid circulation portion 100 may include a first tank 110, a first chemical liquid supply line 120 and a first chemical liquid recovery line 130, and the second chemical liquid circulation portion 200 may include a second tank 210, a second chemical liquid supply line 220, and a second chemical liquid recovery line 230.

The method of circulating chemical liquid will be described in greater detail with reference to the aforementioned components.

First, the chemical liquid circulation preparation step may include a first chemical liquid circulation preparation step (S100) of opening the first chemical liquid recovery line 130 before opening the first chemical liquid supply line 120 installed in the first tank 110 of the first chemical liquid circulation portion 100. That is, the first chemical liquid circulation preparation step (S100) may be of opening the first recovery valve 131 of the first chemical liquid recovery line 130 before opening the first supply valve 121 of the first chemical liquid supply line 120. In the case, the opening of the first chemical liquid supply line 120 may be performed in the first chemical liquid exchanging step (S200) between the first chemical liquid circulation preparation step (S100) and the first chemical liquid circulation step (S300), and the first chemical liquid exchanging step (S200) will be described later.

The chemical liquid circulation step may include a first chemical liquid circulation step (S300) performed after the first chemical liquid circulation preparation step (S100), and the first chemical liquid circulation step (S300) may be of circulating the chemical liquid through the first chemical liquid supply line 120 and the first chemical liquid recovery line 130. In the first chemical liquid circulation step (S300), the second chemical liquid supply line 220 and the second chemical liquid recovery line 230 installed in the second tank 210 of the second chemical liquid circulation portion 200 may be in a closed state. That is, in the first chemical liquid circulation step (S300), the second supply valve of the second chemical liquid supply line 220 may be in a closed state, and the second recovery valve 231 of the second chemical liquid recovery line 230 may be in a closed state.

In the example embodiment, a first chemical liquid exchanging step (S200) may be further included. The first chemical liquid exchanging step (S200) may be performed between the first chemical liquid circulation preparation step (S100) and the first chemical liquid circulation step. The first chemical liquid exchanging step (S200) may be of closing the second chemical liquid recovery line 230 and opening the first chemical liquid supply line 120. That is, the first chemical liquid exchanging step (S200) may be of closing the second recovery valve 231 of the second chemical liquid recovery line 230 and opening the first supply valve 121 of the first chemical liquid supply line 120.

In the above-described step configurations, in the example embodiment, the first chemical liquid circulation preparation step (S100) may be included differently from the prior art, and in the first chemical liquid circulation preparation step (S100), the first chemical liquid recovery line 130 may be opened before the first chemical liquid supply line 120. Due to the first chemical liquid circulation preparation step (S100), air bubbles included in the chemical liquid recovered through the first chemical liquid recovery line 130 may not flow into the first chemical liquid supply line 120, and may rise to the upper side from the chemical liquid contained in the first tank 110 and may be removed, such that, when the first chemical liquid supply line 120 is opened in the first chemical liquid exchanging step (S200) thereafter, the chemical liquid from which air bubbles are removed may be supplied through the first chemical liquid supply line 120.

The chemical liquid circulation preparation step may include a second chemical liquid circulation preparation step (S400) performed after the first chemical liquid circulation step. The second chemical liquid circulation preparation step (S400) may be of opening the second chemical liquid recovery line 230 before opening the second chemical liquid supply line 220 installed in the second tank 210 of the 2 chemical liquid circulation portion 200. That is, the second chemical liquid circulation preparation step (S400) may be of opening the second recovery valve 231 of the second chemical liquid recovery line 230 before opening the second supply valve of the second chemical liquid supply line 220. In the case, the opening of the second chemical liquid supply line 220 may be performed in the second chemical liquid exchanging step (S500) between the second chemical liquid circulation preparation step (S400) and the second chemical liquid circulation step (S600), and the second chemical liquid exchanging step (S500) will be described later.

The chemical liquid circulation step may include a second chemical liquid circulation step (S600) performed after the second chemical liquid circulation preparation step (S400), and the second chemical liquid circulation step (S600) may be of circulating the chemical liquid through the second chemical liquid supply line 220 and the second chemical liquid recovery line 230. In the second chemical liquid circulation step (S600), the first chemical liquid supply line 120 and the first chemical liquid recovery line 130 of the first chemical liquid circulation portion 100 may be in a closed state. That is, in the second chemical liquid circulation step (S600), the first supply valve 121 of the first chemical liquid supply line 120 may be in a closed state, and the first recovery valve 131 of the first chemical liquid recovery line 130 may be in a closed state.

The example embodiment may further include a second chemical liquid exchanging step (S500). The second chemical liquid exchanging step (S500) may be performed between the second chemical liquid circulation preparation step (S400) and the second chemical liquid circulation step (S600). The second chemical liquid exchanging step (S500) may be of closing the first chemical liquid recovery line 130 and opening the second chemical liquid supply line 220. That is, the second chemical liquid exchanging step (S500) may be of closing the second recovery valve 231 of the second chemical liquid recovery line 230 and opening the second supply valve of the second chemical liquid supply line 220.

In the above-described step configurations, in the example embodiment, the second chemical liquid circulation preparation step (S400) may be included differently from the prior art, and in the second chemical liquid circulation preparation step (S400), the second chemical liquid recovery line 230 may be opened before the second chemical liquid supply line 220. Due to the second chemical liquid circulation preparation step (S400), air bubbles included in the chemical liquid recovered through the second chemical liquid recovery line 230 may not flow into the second chemical liquid supply line 220, and may rise to the upper side from the chemical liquid contained in the second tank 210 and is removed, such that, when the second chemical liquid supply line 220 is opened in the second chemical liquid exchanging step (S500), the chemical liquid from which air bubbles are removed may be supplied through the second chemical liquid supply line 220.

In the method of circulating chemical liquid in the example embodiment configured as described above, the above-described steps may be performed in order as below.

In the example embodiment, the first chemical liquid circulation preparation step (S100), the first chemical liquid exchanging step (S200), the first chemical liquid circulation step (S300), the second chemical liquid circulation preparation step (S400), the second chemical liquid exchanging step (S500), and the second chemical liquid circulation step (S600) may be repeated in order. Further, in the example embodiment, as a plurality of chemical liquid circulation portions are provided, although not illustrated in the drawing, as another example, a third chemical liquid circulation portion may be further included. In the case, in the third chemical liquid circulation preparation step, the third chemical liquid recovery line may be opened before the third chemical liquid supply line is opened similarly to the first chemical liquid circulation preparation step (S100) and the second chemical liquid circulation preparation step (S400), such that air bubbles in the chemical liquid recovered through the third chemical liquid recovery line may be removed.

The method of processing a substrate in the example embodiment may include a chemical liquid supplying step together with the steps of the method of circulating chemical liquid described above. The chemical liquid supplying step may be of supplying the chemical liquid from the first chemical liquid supply line 120 or the second chemical liquid supply line 220 to the process chamber side through a chamber supply line CS so as to discharge the chemical liquid to the substrate disposed in the process chamber when the substrate is processed. That is, while circulating the chemical liquid in the steps of the method of circulating chemical liquid described above, when the substrate treatment process is performed, the chamber supply line CS may be opened, such that the chemical liquid may be supplied to the process chamber side through the chamber supply line CS and may be discharged to the substrate.

Figure 8:
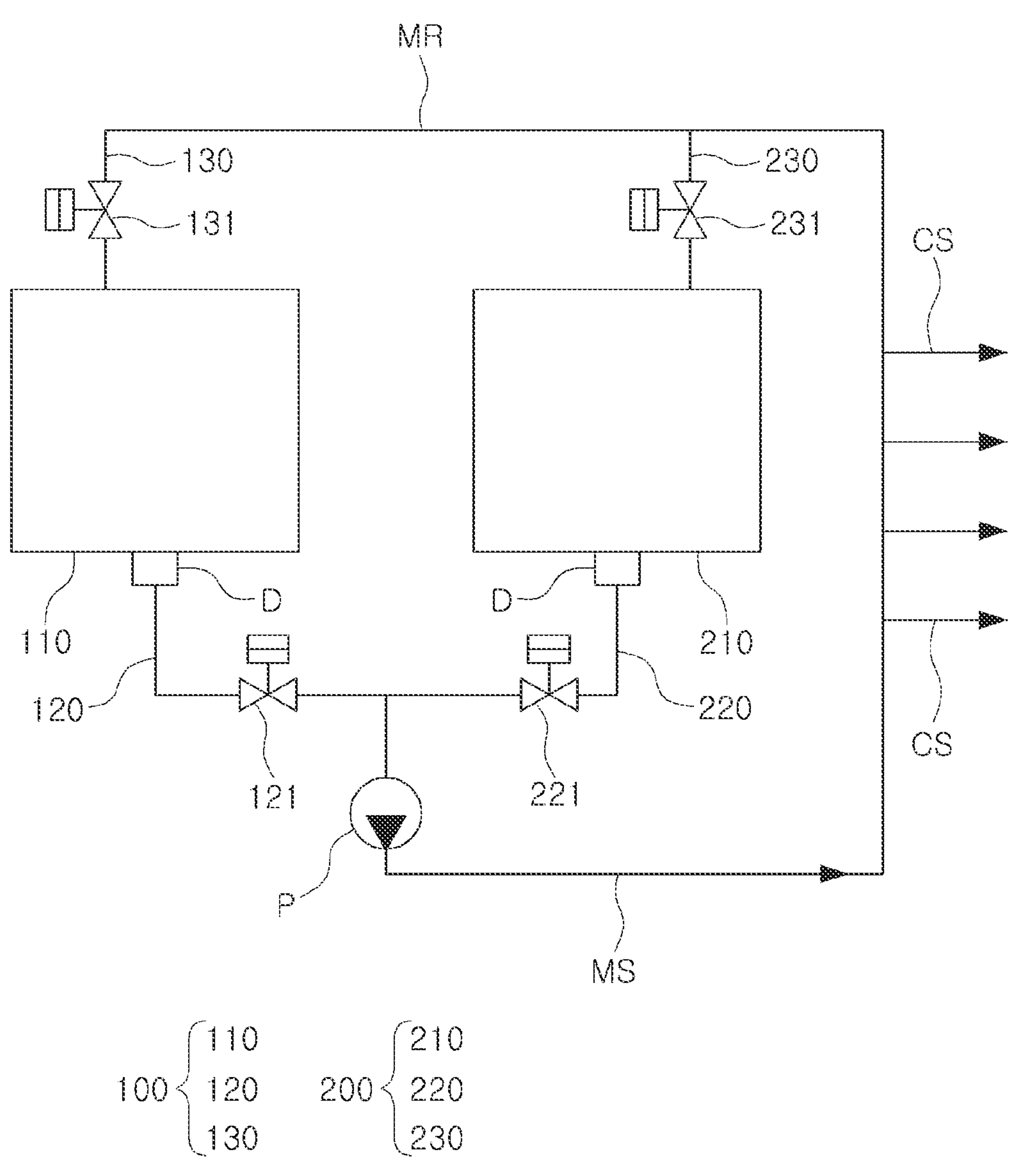
FIG. 8 is a diagram illustrating a chemical liquid circulation portion having a deaeration unit for removing air bubbles in the chemical liquid installed therein according to an example embodiment of the present disclosure.

FIG. 8 is a diagram illustrating a chemical liquid circulation portion having a deaeration unit for removing air bubbles in the chemical liquid installed therein according to an example embodiment.

A deaeration unit D may be installed in the chemical liquid supply line in the example embodiment, and air bubbles of the chemical liquid may be removed by the deaeration unit D. That is, as an example, as illustrated in the drawing, the deaeration unit D may be installed in each of the first chemical liquid supply line 120 and the second chemical liquid supply line 220. In the case, the deaeration unit D is not limited thereto, and any general deaeration component for removing air bubbles from chemical liquid, such as an air bubble trap and a defoamer, may be used.

Air bubbles may be primarily removed by the above-described chemical liquid circulation preparation step (the first chemical liquid circulation preparation step (S100) and the second chemical liquid circulation preparation step (S400), and air bubbles may be secondarily removed by the deaeration unit D, such that an air bubble removal rate may be increased.

The components having the same reference numerals as those in FIG. 1 in FIG. 8 may have the same configuration, and thus, a description thereof will not be provided.

In the example embodiment, the chemical liquid circulation preparation step of opening the chemical liquid recovery line may be performed before opening the chemical liquid supply line, such that air bubbles included in the chemical liquid recovered through the chemical liquid recovery line may not flow into the chemical liquid supply line, and may rise to the upper side from the chemical liquid contained in the tank and may be removed.

As such, in the example embodiment, by removing air bubbles in the chemical liquid recovered in the tank, particles included in the air bubbles may also be removed together, such that substrate processing failure due to particles may be prevented.

While the example embodiments have been illustrated and described above, it will be apparent to those skilled in the art that modifications and variations could be made without departing from the scope of the present disclosure as defined by the appended claims.

What is claimed is:

1. A method of circulating chemical liquid, the method comprising:

a chemical liquid circulation step of circulating chemical liquid through a chemical liquid supply line installed at an outlet of a tank of a chemical liquid circulation portion and a chemical liquid recovery line installed at an inlet of the tank; and a chemical liquid circulation preparation step comprising removing air bubbles from chemical liquid recovered to the chemical liquid recovery line, the removing of air bubbles including opening the chemical liquid recovery line before the chemical liquid supply line is opened, the chemical liquid circulation step being performed after the removing, wherein the chemical liquid circulation step is initiated by actuation of the chemical liquid recovery line prior to actuation of the chemical liquid supply line, and wherein, during the chemical liquid circulation preparation step, the chemical liquid recovered through the chemical liquid recovery line is introduced into the tank while the chemical liquid supply line remains closed such that air bubbles in the recovered chemical liquid rise to an upper side from chemical liquid contained in the tank and are removed before the chemical liquid supply line is opened.

2. The method of claim 1, wherein the chemical liquid circulation portion includes at least a first chemical liquid circulation portion and a second chemical liquid circulation portion, wherein the chemical liquid circulation preparation step includes a first chemical liquid circulation preparation step of opening a first chemical liquid recovery line installed at an inlet of a first tank before opening a first chemical liquid supply line installed at an outlet of the first tank of the first chemical liquid circulation portion, and wherein the chemical liquid circulation step includes a first chemical liquid circulation step performed after the first chemical liquid circulation preparation step and circulating the chemical liquid through the first chemical liquid supply line and the first chemical liquid recovery line.

3. The method of claim 2, wherein, in the first chemical liquid circulation step, a second chemical liquid supply line installed at an outlet of a second tank of the second chemical liquid circulation portion and a second chemical liquid recovery line installed at an inlet of the second tank are in a closed state.

4. The method of claim 2, wherein the method further includes a first chemical liquid exchanging step of closing the second chemical liquid recovery line and opening the first chemical liquid supply line between the first chemical liquid circulation preparation step and the first chemical liquid circulation step.

5. The method of claim 2, wherein the chemical liquid circulation preparation step includes a second chemical liquid circulation preparation step of opening the second chemical liquid recovery line before opening the second chemical liquid supply line after the first chemical liquid circulation step, and wherein the chemical liquid circulation step includes a second chemical liquid circulation step of circulating the chemical liquid through the second chemical liquid supply line and the second chemical liquid recovery line after the second chemical liquid circulation preparation step.

6. The method of claim 5, wherein, in the second chemical liquid circulation step, the first chemical liquid supply line and the first chemical liquid recovery line are in a closed state.

7. The method of claim 6, wherein the method further includes a second chemical liquid exchanging step of closing the first chemical liquid recovery line and opening the second chemical liquid supply line between the second chemical liquid circulation preparation step and the second chemical liquid circulation step.

8. The method of claim 7, wherein the first chemical liquid circulation preparation step, the first chemical liquid exchanging step, the first chemical liquid circulation step, the second chemical liquid circulation preparation step, the second chemical liquid exchanging step, and the second chemical liquid circulation step are repeated in order.

9. The method of claim 3, wherein the first chemical liquid supply line and the second chemical liquid supply line is connected to a main supply line in which a pump is installed, and the first chemical liquid recovery line and the second chemical liquid recovery line are connected to a main recovery line.

10. The method of claim 9, wherein the main supply line is connected to the main recovery line, and wherein the main supply line is connected to the process chamber by at least one chamber supply line.

11. The method of claim 1, wherein a deaeration unit is installed in the chemical liquid supply line, and air bubbles of the chemical liquid are removed by the deaeration unit.

12. A method of circulating chemical liquid, the method comprising:

a first chemical liquid circulation step of circulating chemical liquid through a first chemical liquid supply line installed at an outlet of a first tank of a first chemical liquid circulation portion and a first chemical liquid recovery line installed at an inlet of the first tank; and a first chemical liquid circulation preparation step comprising removing air bubbles from chemical liquid recovered to the first chemical liquid recovery line by opening a first recovery valve of the first chemical liquid recovery line before opening a first supply valve of the first chemical liquid supply line, wherein the first chemical liquid circulation step is initiated after removal of the air bubbles, wherein, during the first chemical liquid circulation preparation step, the chemical liquid recovered through the first chemical liquid recovery line is introduced into the first tank while the first chemical liquid supply line remains closed such that air bubbles in the recovered chemical liquid rise to an upper side from chemical liquid contained in the first tank and are removed before the first chemical liquid supply line is opened, and wherein, in the first chemical liquid circulation step, a second supply valve of a second chemical liquid supply line installed at an outlet of a second tank of a second chemical liquid circulation portion and a second recovery valve of a second chemical liquid recovery line installed at an inlet of the second tank are in a closed state.

13. The method of claim 12, wherein the method further includes a first chemical liquid exchanging step of closing the second recovery valve of the second chemical liquid recovery line and opening the first supply valve of the first chemical liquid supply line between the first chemical liquid circulation preparation step and the first chemical liquid circulation step.

14. The method of claim 13, wherein the method further includes:

a second chemical liquid circulation preparation step of opening the second recovery valve of the second chemical liquid recovery line before opening the second supply valve of the second chemical liquid supply line, after the first chemical liquid circulation step; and a second chemical liquid circulation step of circulating the chemical liquid through the second chemical liquid supply line and the second chemical liquid recovery line, after the second chemical liquid circulation preparation step, wherein, in the second chemical liquid circulation step, the first supply valve of the first chemical liquid supply line and the first recovery valve of the first chemical liquid recovery line are in a closed state.

15. The method of claim 14, wherein the method further includes a second chemical liquid exchanging step of closing the first recovery valve of the first chemical liquid recovery line and opening the second supply valve of the second chemical liquid supply line between the second chemical liquid circulation preparation step and the second chemical liquid circulation step.

16. The method of claim 15, wherein the first chemical liquid circulation preparation step, the first chemical liquid exchanging step, the first chemical liquid circulation step, the second chemical liquid circulation preparation step, the second chemical liquid exchanging step, and the second chemical liquid circulation step are repeated in order.

17. A method of processing a substrate, the method comprising:

a first chemical liquid circulation step of circulating chemical liquid through a first chemical liquid supply line installed at an outlet of a first tank of a first chemical liquid circulation portion and a first chemical liquid recovery line at an inlet of the first tank, wherein a second supply valve of a second chemical liquid supply line installed at an outlet of a second tank of a second chemical liquid circulation portion and a second recovery valve of a second chemical liquid recovery line installed at an inlet of the second tank are in a closed state; and a first chemical liquid circulation preparation step comprising removing air bubbles from chemical liquid recovered to the first chemical liquid recovery line by opening a first recovery valve of the first chemical liquid recovery line before opening a first supply valve of the first chemical liquid supply line, wherein the first chemical liquid circulation preparation step is performed before the chemical liquid circulation step and the first chemical liquid circulation step is initiated after removal of air bubbles; and a chemical liquid supplying step of supplying the chemical liquid from the first chemical liquid supply line or the second chemical liquid supply line to a process chamber to discharge the chemical liquid to the substrate disposed in the process chamber when the substrate is processed in the process chamber, wherein, during the first chemical liquid circulation preparation step, the chemical liquid recovered through the first chemical liquid recovery line is introduced into the first tank while the first chemical liquid supply line remains closed such that air bubbles in the recovered chemical liquid rise to an upper side from chemical liquid contained in the first tank and are removed before the first chemical liquid supply line is opened.

18. The method of claim 17, wherein the method further includes a chemical liquid exchanging step of closing the second recovery valve of the second chemical liquid recovery line and opening the first supply valve of the first chemical liquid supply line between the first chemical liquid circulation preparation step and the first chemical liquid circulation step.

19. The method of claim 18, wherein the method further includes:

a second chemical liquid circulation preparation step of opening the second recovery valve of the second chemical liquid recovery line before opening the second supply valve of the second chemical liquid supply line, after the first chemical liquid circulation step; and a second chemical liquid circulation step of circulating chemical liquid through the second chemical liquid supply line and the second chemical liquid recovery line, after the second chemical liquid circulation preparation step, wherein, in the second chemical liquid circulation step, the first supply valve of the first chemical liquid supply line and the first recovery valve of the first chemical liquid recovery line are in a closed state.

20. The method of claim 19, wherein the method further includes a second chemical liquid exchanging step of closing the first recovery valve of the first chemical liquid recovery line and opening the second supply valve of the second chemical liquid supply line between the second chemical liquid circulation preparation step and the second chemical liquid circulation step.

* * * * *